United States Patent Office
3,534,230
Patented Oct. 13, 1970

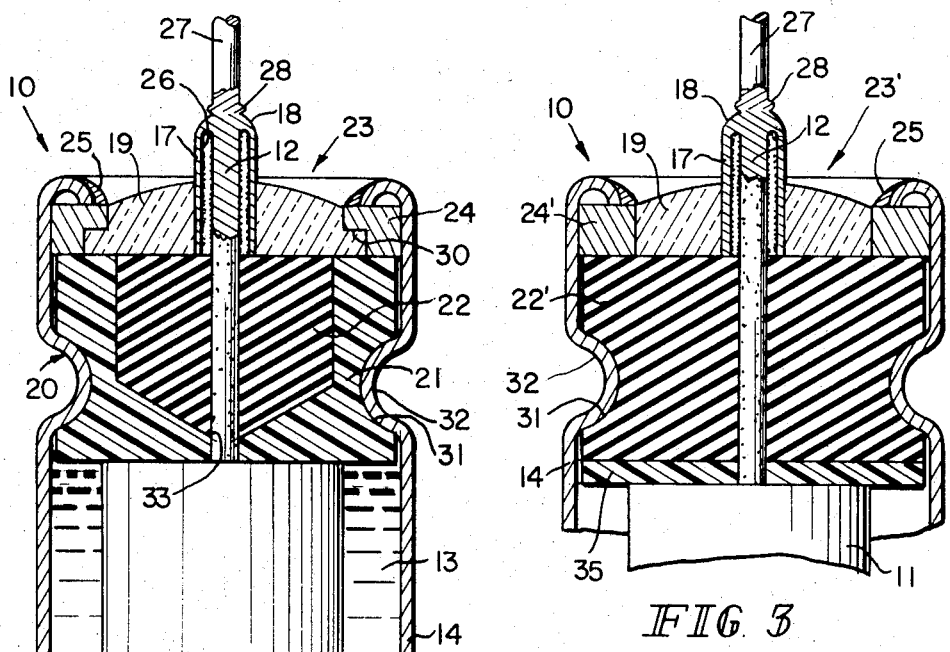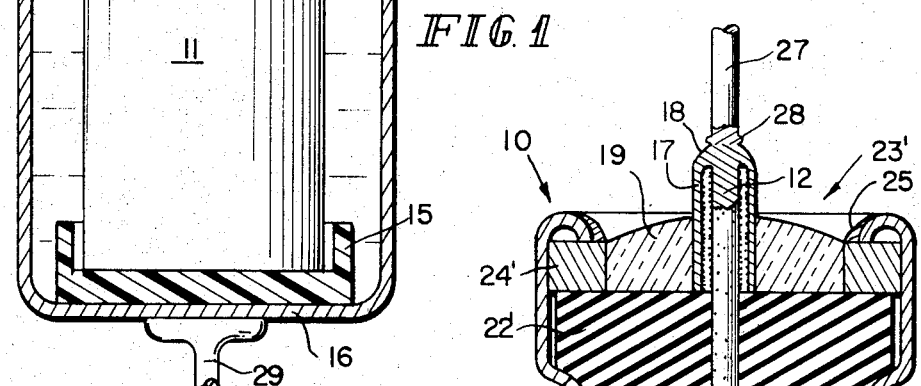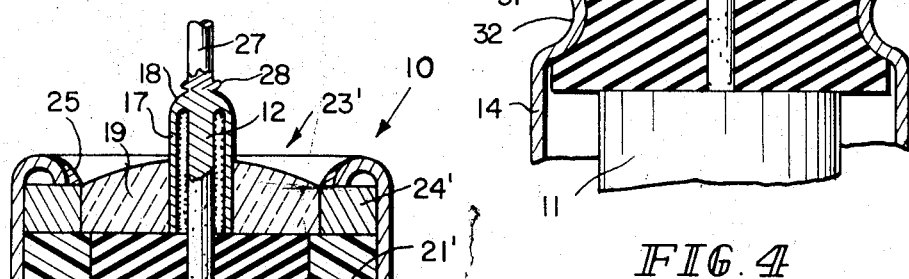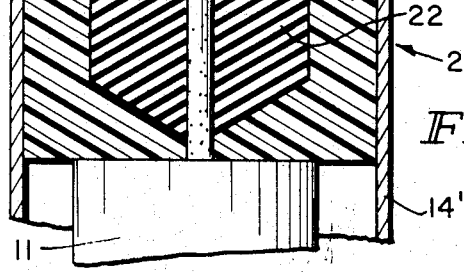

3,534,230
ELECTROLYTIC CAPACITOR HAVING TWO SEALS WITH ONE HAVING REACTION INHIBITING SURFACE
Stanley L. Krasienko, Indianapolis, Ind., and John D. Howell, Lake Park, Fla., assignors to P. R. Mallory & Co. Inc., Indianapolis, Ind., a corporation of Delaware
Filed June 17, 1968, Ser. No. 737,470
Int. Cl. H01g 9/08
U.S. Cl. 317—230
9 Claims

ABSTRACT OF THE DISCLOSURE

A capacitor device including a glass-to-metal primary seal having an elongated tubular eyelet of film-forming metal projecting through the glass. An anode riser of film-forming metal projects into the hollow portion of the eyelet. The eyelet and the anode are bonded together at a selected location removed from the glass mass. The adjacent surfaces of inner wall of the eyelet and the anode riser are anodized. The capacitor device further includes a secondary seal for substantially preventing materials contained within a capacitor can having an open end closed by the glass-to-metal primary seal from forming a bond inhibiting reaction product with the surface or surfaces of the glass-to-metal primary seal and the surface or surfaces of the can which are to be bonded.

---

The present invention relates to the combination of a primary seal which substantially overcomes the problem of electrolyte creepage and a secondary seal which substantially prevents a material or materials contained within the housing of the capacitor from forming a bond inhibiting reaction product with surfaces intended to be joined or bonded.

Several presently available electrolytic capacitors use a conductive metal can having at least one open end which serves as a housing and the cathode electrode of the capacitor. The housing contains an anode having a myriad of intercommunicating voids. The anode may be fabricated from any suitable film-forming metal. The anode may be anodized or aged so as to form a dielectric oxide film thereon using generally accepted anodizing or ageing techniques. The anode of film-forming metal is substantially immersed in a suitable acid electrolyte solution. The open end of the can may be closed by a suitable sealing means such as a gasket seal which may be compressively retained by the open end of the can or the open end of the can may be closed by a suitable glass-to-metal seal seated in the open end of the can and bonded thereto so as to provide a hermetic seal. The gasket seal has good elasticity and is substantially unaffected by the corrosive characteristic of the electrolyte solution and is extrudable to a degree so that when the open end of the capacitor is crimped, the gasket seal is compressed so as to conform to the contours of the can and of the crimp thereby sealing the open end of the can. The importance of preventing the escape of the acid electrolyte solution from the capacitor can should be recognized. For example, if the acid electrolyte solution escapes from the can, the electrical characteristics of the capacitor will be seriously affected and the escape acid electrolyte may attack and damage materials surrounding the capacitor.

The gasket seal and the glass of the glass-to-metal seal each have projecting therefrom a terminal lead which is connected to the anode of the capacitor. The seal around the terminal lead is tight thereby providing a sealed structure satisfactory for general use. However, the gasket type end seal does not provide a hermetic seal.

Although satisfactory for its intended purpose, the gasket seal is generally unsuitable for use in capacitors where the capacitors are subjected to adverse environmental conditions such as elevated temperatures, for the gasket seal is, to a degree, porous and the electrolyte solution will, to some extent, vaporize and diffuse through the porous material of the gasket resulting in an undesirable loss of acid electrolyte.

Reduction in the amount of electrolyte solution present within the capacitor effects the electrical characteristics of the device and even more so if the capacitor is a miniature capacitor. Therefore, hermetic seals, that is, glass-to-metal seals, may be used to close the open end of the can housing a capacitor body in operational situations where it is thought that the capacitor device is to be used in an environment which may adversely effect the electrical characteristics of the capacitor such as at temperatures of 100° C. or higher. When the adverse environmental condition is an elevated temperature, the hermetic seal does not prevent vaporization of the electrolyte solution, however, the hermetic seal does substantially prevent the vaporized electrolyte from escaping from the confines of the housing. Therefore, upon cooling and condensing of the electrolyte vapors, substantially the same amount of electrolyte solution is present within the can as was present before the electrolyte solution was subjected to the elevated temperature.

However, hermetic seals including a metal ferrule or ring surrounding and fused to glass and a terminal lead projecting through the glass may suffer from electrolyte creepage. The electrolyte creepage generally occurs along the anode riser to the glass portion of the glass-to-metal seal. An electrically conductive path may be established between the anode riser and the cathode can. The conductive path between the anode riser and the cathode results in a significant increase in the leakage current electrical characteristic of the capacitor which may ultimately result in electrical failure of the capacitor.

The use of a tubular metal eyelet into which the anode riser projects and is bonded thereto at a location removed from the glass so as to provide protection against electrolyte creepage has been proposed. Although the structure moderately successful, electrolyte creepage and, hence, a conductive path bridging from the anode riser to the cathode can may still occur resulting in a capacitor having an undesirably high leakage current characteristic.

In addition, the use of a chemically inert metal such as stainless steel and the like as the metal ferrule of the glass-to-metal seal has been proposed. However, the stainless steel of the type suitable for use in the hermetic seal may develop a thermal oxide on the exposed surfaces thereof at the elevated temperatures required to fabricate the glass-to-metal seal which thermal oxide film, tends to inhibit the solderability of the stainless steel ferrule. Plating of metals and/or metal alloys over the stainless steel ferrule which are not corrosively attacked by the acid electrolyte solution and which do not develop a thermal oxide film at the elevated temperatures may be done to provide a solderable glass-to-metal seal wherein the metal ferrule consists primarily of a stainless steel core with thin coatings of metals thereover.

However, on occasion, the plated metallic surfaces of the glass-to-plated stainless steel seal may tend to form a bonding inhibiting reaction product with materials which may be within the capacitor can such as, possibly, the vapors formed by the vaporization of a fractional portion of the acid electrolyte solution during the soldering or welding of the glass-to-plated stainless steel to the can so as to close the open end of the can. The bonding inhibiting reaction product tends to hinder the welding or soldering operation so that, on occasion, an imperfect weld or solder joint may be formed thereby undermining the ability of the joint to maintain the hermetic seal.

Therefore, it is an object of the present invention to overcome the problems enumerated above.

Another object of the present invention is to provide a hermetically sealed electrolytic capacitor.

A further object of the present invention is to provide a hermetic seal design which substantially eliminates the problems associated with acid electrolyte creepage in combination with a secondary seal which substantially prevents formation of bond inhibiting reaction products on the metallic surfaces to be bonded.

Yet another object of the present invention is to provide a hermetically sealed capacitor including means for substantially preventing vapors from the acid electrolyte solution from forming a bond inhibiting reaction product with metallic portions of a glass-to-metal seal and/or with the metallic portions of the side wall of the housing of the capacitor during the step of joining or bonding the glass-to-metal seal to the side wall of the capacitor can to thereby hermetically seal the capacitor.

Yet still another object of the present invention is to provide a hermetically sealed capacitor including a glass-to-metal primary seal and a secondary seal.

A further object of the present invention is to provide a glass-to-metal seal including a tubular eyelet which has the inner wall thereof anodized in combination with a secondary seal.

Another object of the present invention is to provide a hermetically sealed capacitor including means providing effective protection from leakage of acid electrolyte vapor from the internal areas of the capacitor containing the acid electrolyte solution during the bonding of the glass-to-metal seal to the inner wall of the housing at a comparatively nominal expense.

Yet another object of the present invention is to provide a hermetically sealed liquid electrolyte capacitor including a hermetic seal which substantially eliminates the harmful results of electrolyte creepage.

Yet still another object of the present invention is to provide an improved hermetically sealed electronic device wherein the housing components thereof are bonded together so as to resist cracking therebetween even when subjected to widely fluctuating temperatures.

A further object of the present invention is to provide a process for joining at least two metal parts of which one of the parts is predominately stainless steel so as to provide a strong mechanical joint and to provide a seal between the metallic parts which is substantially hermetic.

With the aforementioned objects enumerated, other objects will be apparent to those persons possessing ordinary skill in the art. Other objects will appear in the following description, appended claims and appended drawings. The invention relates to the novel construction, combination, arrangement and cooperation of elements as hereinafter described and more particularly as defined in the appended claims.

The appended drawings illustrate embodiments of the present invention constructed to function in an advantageous mode for the practical application of the basic principles involved in the hereinafter described invention.

In the drawings:

FIG. 1 is a cross sectional view of an electrolytic capacitor incorporating the subject matter of the present invention;

FIG. 2 is a partial cross sectional view illustrating another embodiment of the combination of the glass-to-metal primary seal and the secondary seal.

FIG. 3 is a partial cross sectional view showing yet another embodiment of the combination of the glass-to-metal primary seal and secondary seal of the present invention; and FIG. 4 is a partial cross sectional view of the present invention illustrating yet still another embodiment of the structure of the combination of the glass-to-metal primary seal and the secondary seal.

Generally speaking, the present invention relates to the combination of a glass-to-metal primary seal and a secondary seal. The glass-to-metal primary seal includes an elongated tubular eyelet having a portion thereof bonded to an anode riser. The inner periphery of the eyelet is anodized as is the anode riser. The secondary seal is positioned between the glass-to-metal primary seal and the anode thereby substantially preventing materials in the can from forming a bond inhibiting reaction product which may hinder the bonding of the primary seal to the can.

An electrolytic capacitor 10 is illustrated in FIG. 1 of the drawing. The capacitor includes an anode 11 of a porous film-forming metal such as tantalum, niobium, titanium, hafnium, zirconium and the like. Of the several film-forming metals, tantalum is preferred. The porous anode may be prepared by compacting and sintering the metal powder by conventional powder metallurgy techniques. After sintering, the anode includes a multiplicity of intercommunicating voids (not shown) which significantly multiplies the surface area of the anode with respect to the relatively small volume of the anode. An axial anode riser 12 shown as integral with and extending from the anode is fabricated from the same film-forming metal as is the anode. For example, if the anode is composed essentially of tantalum, the anode riser is composed essentially of tantalum. The powder to be used to fabricate the anode riser may be included with the powder used to fabricate the anode when the anode powder is pressed and sintered or the anode riser may be formed separately from the anode and then attached to the anode.

The anode 11 is substantially immersed in an electrolyte solution 13. The electrolyte solution may be of any several different acid electrolyte solutions such as sulfuric acid, phosphoric acid, hydrochloric acid and the like with or without solvents such as ethylene glycol and the like which conducts ions between the electrodes of the capacitor and which is capable of forming a metal oxide film on the surface of the anode when the anode is subjected to a positive potential with respect to the electrolyte solution. Of the several available electrolyte solutions, a sulfuric acid electrolyte solution having a concentration of about 39% by weight sulfuric acid is preferred.

The anode 11 may be supported by and electrically insulated from cathode can 14 by an insulating cup-like means 15 which may be fabricated from any suitable electrically non-conductive and chemically inert material such as a fluorocarbon copolymer material which includes polytrifluorochloroethylene, polytetrafluoroethylene, combinations thereof and the like. The inner diameter of the cup-like means may exceed the outer diameter of the anode so as to permit the acid electrolyte solution 13 to remain in contact with the portion of the longitudinal surface of the anode contained within the confines of the cup-like means. The cup-like means 15, in turn, may be supported by the closed end 16 of the cathode can 14. The entire can or container 14 or, alternatively, the inner surfaces of the can may be clad with a highly conductive metal such as any metals in the group consisting of silver, gold, aluminum, tinned copper and the like. Of the several metals which may be used to fabricate the can or, alternatively, to clad the inner surface of the can, silver is preferred.

A conductive film-forming metal tubular eyelet 17 of the same film-forming metal as the anode riser is bonded to the anode riser as shown at 18 by any suitable bonding technique such as by welding and the like. The tubular eyelet may extend axially from the open end of the container. It should be noted that inner wall of the tubular eyelet is spaced from the periphery of the anode riser except where bonded to the riser at 18. Both the inner wall of the tubular eyelet and the anode riser are anodized so that if the acid electrolyte creeps into the general vicinity of glass mass 19, the tubular eyelet 17 and the anode riser 12, a conductive path is not formed between the anode and cathode since all components of the anode are anodized with a dielectric oxide film 26 which extends along the entire length of the tubular eyelet and the anode riser. The tubular eyelet may serve as the positive lead for the completed capacitor.

A conductive metal anode terminal lead 27 may be butt welded, soldered and the like as shown at 28 to the exterior surface of the welded end 18 between the tubular eyelet and the anode riser. The lead may serve as the anode termination of the capacitor. A conductive metal cathode terminal lead 29 may be butt welded, soldered and the like to the exterior surface of the closed end 16 of the can 14. The cathode terminal lead may extend axially from the closed end of the can. It should be noted, however, that the cathode terminal lead need not be connected to the housing of the capacitor since the can itself may function as the cathode terminal of the capacitor thereby eliminating the necessity of a cathode terminal lead.

An apertured secondary seal 20 is positioned so as to substantially circumscribe a portion of the length of the anode riser to thereby substantially occupy the area between the glass mass 19 and the anode 11. The secondary seal includes a generally apertured cylindrical piece 21 of a suitable plastic material and an insert 22 of a suitable resilient material. The insert 22 may have the general configuration shown in FIG. 1 or may be normally, i.e. uncompressed, substantially egg-shaped, spherical, cylindrical or the like. The apertured cylindrical piece of the secondary seal may be fabricated from materials such as a fluorocarbon copolymer material which includes polytetrafluoroethylene, polytrifluorochloroethylene and the like. The insert 22 may be selected from resilient materials such as silicone rubber, butyl rubber, polytrifluorochloroethylene and the like. The resilient characteristic permits the insert 22 to deform to the general configuration shown in FIG. 1. The function of the secondary seal will be discussed herein later.

A glass-to-metal hermetic seal 23 is shown in FIG. 1 as substantially closing the open end of the can 14. The glass-to-metal seal includes metal ferrule or ring 24 substantially circumscribing a glass annulus or mass 19. The metal ring may be soldered, welded or the like as shown at 25 to the bent over edge portion 26 of the can 16. The ring 24 may include a notch 30 which extneds substantially around the inner periphery of the ring as shown in FIG. 1. It is seen that the glass mass 19 substantially fills the notch 30 thereby providing additional support to the joint between the glass and the ferrule.

A suitable glass for use as the glass mass or annulus of the glass-to-metal seal may contain the following constituents by weight: about 28–38% silicon, about 20–23% sodium, about 4–5% potassium, about 10–12% barium and the remainder oxygen with traces of lead, chromium, lithium, copper and tin.

The metal ferrule or ring 24 of the glass-to-metal seal may consist essentially of a metal or metals which are not adversely effected by the corrosive action of the acid electrolyte solution 13. Of the several possible metals, stainless steel is preferred. If stainless steel is used, a suitable stainless steel consists essentially of about 2% manganese, about 1% silicon, 19–21% chromium, about 30–38% nickel, about 2–3% molybdenum, about 3–4% copper with minor additions of columbium, tantalum, phosphorus and sulfur and the remainder iron. The percentages given above are by weight unless otherwise indicated. The exposed surfaces of stainless steel ferrule, on occasion, may tend to form a tenacious thermal oxide film during fabrication of the glass-to-metal seal which tends to inhibit the soldering operation of the seal to the side wall of the can.

In order to substantially prevent the formation of the thermal oxide film on the exposed surfaces of the ferrule, the stainless steel ferrule may be covered with a thin barrier layer of metal selected from the group consisting of nickel, cobalt and chromium which in turn is covered with a layer of a silver-noble alloy. The noble metal may be selected from the group consisting of gold, palladium, platinum, rhenium and osmium. If a nickel barrier layer metal is used, the nickel layer is about 0.0002 to 0.0004 inch thick. If an alloy of silver and gold overlays the nickel barrier, the alloys consists essentially of about 80–98% by weight silver, the remainder gold with minor amount of impurities. The preferred alloy composition is about 88% by weight silver the remainder essentially gold with minor amounts of impurities. The resulting glass-to-metal seal does not appear to form the tenacious thermal oxide film on the exterior surfaces thereof. The resultant seal is solderable to the can and is substantially uneffected by the corrosive characteristic of the acid electrolyte solution.

However, the layered metal of the seal may form a bond inhibiting reaction product with vapors of the acid electrolyte which may be produced during the step of bonding the glass-to-metal seal to the can. It is thought if a sulfuric acid solution is used as the electrolyte for the capacitor, a portion of the electrolyte may vaporize and may form an oxide such as $SO_2$, and/or a sulfate such as $SO_4$, which may react with the layered metal on the stainless steel or the side wall of the can to form a bond inhibiting reaction product.

The secondary seal 20 is seated between the anode 11 and the glass-to-metal seal 23 so as to substantially occupy the void area and/or areas between the glass-to-metal seal 23 and the uppermost periphery of the anode 11. The apertured piece 21 of the secondary seal has a generally cylindrical configuration which includes a groove 31 extending circumferentially around the apertured piece 21. It is seen from FIG. 1 that circumferential crimp 32 extends around the can and substantially mates with the apertured piece 21 thereby retaining the apertured piece in a fixed position within the can. The piece 21 includes a substantially centrally located aperture 33. The aperture is generally cylindrical in shape with a conical end as shown in FIG. 1. An apertured insert 22 which may have the general configuration of the aperture 33 or be substantially egg-shaped, spherical-shaped, cylindrical-shaped or the like is positioned within the aperture of the piece 21. The uppermost extremity of the insert would normally extend beyond the uppermost extremity of the piece 21. However, the insert 22 is compressed between the glass-to-metal seal 23 and the lowermost side walls of the aperture 33. The compressive force exerted on the insert 22 generally tends to displace the insert perpendicular to the direction of the compressive forces exerted thereon. The side walls of the piece 21 are displaced so that in the general area of the crimp in the can a substantially tight fit exists between the piece 21 and the side wall of the can. It should be seen that the insert 22 also is compressively displaced so as to tightly fit with the anode riser 12. The compressively retained secondary seal is sufficient to substantially prevent vapors which may be formed during the bonding of the glass-to-metal seal to the side wall of the can from impinging on the surfaces to be bonded together. Preventing the escape of vapors from the can appears to substantially eliminate the formation of bond inhibiting reaction products on the surfaces of the can and glass-to-metal seal to be bonded together. The areas to be bonded or joined appear to remain solderable using conventional bonding techniques such as soldering, welding and the like.

FIG. 2 illustrates an embodiment of the present invention wherein apertured piece 21' does not include a circumferential groove which mates with a circumferential groove of the can since the can 14' does not include a crimp. The piece 21 engages with the side wall of the can substantially along its entire inner peripheral length. Also note that the ferrule 24' does not include a recess substantially filled with glass as illustrated in FIG. 1.

FIG. 3 illustrates yet another embodiment of the present invention wherein apertured insert 22' occupies nearly all of the area previously occupied by the apertured piece 21 in addition to the area occupied by the apertured insert 22 as shown in FIG. 1. An anode spacer 35 is used to space the insert 22' from the uppermost surface of the anode 11.

FIG. 4 illustrates essentially the same structure shown in FIG. 3 except that the anode spacer 35 has been omitted.

Having thus explained the structure of the present invention, the function of the secondary seal will be described.

The glass-to-metal seal is welded or soldered as indicated at 25. During the welding or soldering step or operation, sufficient heat may be developed so as to cause a small portion of the acid electrolyte solution to vaporize. The secondary seal substantially prevents the vapors of the electrolyte from forming a bond inhibiting reaction product such as an oxide, a sulfate, a chloride or the like with the area of the glass-to-metal seal and the can to be bonded by techniques such as soldering, welding or the like. The soldering, welding or the like step or operation may be carried out easily and conveniently without the use of an ancillary flux means to clean the metal portion of the glass-to-metal seal and the metal portion of the can which are to be soldered, welded or otherwise bonded together.

While the invention is illustrated and described in several embodiments, it will be understood that modifications and variations may be affected without departing from the scope of the novel concepts of this invention and as set forth in the appended claims.

Having thus described our invention, we claim:

1. An electrolytic capacitor including an anode, an anode riser projecting from said anode, a can having an open end and a closed end for retaining said anode and said anode riser, a liquid electrolyte solution substantially immersing said anode, and a primary seal bonded to the side wall of said can thereby closing the open end of said can, said primary seal comprising a glass-to-metal seal having a tubular eyelet mounted in the glass with its inner surface anodized, said anode riser extending through and connected to the end sealed portion of said tube, and a secondary seal positioned between said glass-to-metal seal and said anode substantially preventing materials in said can from contact with said glass-to-metal seal and forming at least one reaction product harmful to bonding of said glass-to-metal seal to said inner wall of said can.

2. The electrolytic capacitor of claim 1, wherein said secondary seal is apertured allowing said anode riser to project therethrough and has a substantially tight fit with said side wall of said can and said anode riser.

3. The electrolytic capacitor of claim 2, wherein said can is crimped therearound retaining said secondary seal in a fixed position.

4. The electrolytic capacitor of claim 2, wherein said secondary seal includes an apertured substantially cylindrical piece and an insert seated in said aperture of said piece whereby the side wall of said piece is biased so as to engage with said side wall of said can.

5. The electrolytic capacitor of claim 4, wherein said insert is compressively seated in said aperture of said piece.

6. The electrolytic capacitor of claim 5, wherein said insert has a normal configuration selected from the group consisting of egg-shaped, spherical-shaped, cylindrical-shaped and a combination of a cylindrical-shape and cone-shape.

7. The electrolytic capacitor of claim 4, wherein said anode riser is spaced from the inner wall of said tubular eyelet along the majority length where said riser projects into said eyelet.

8. The electrolytic capacitor of claim 7, wherein said glass-to-metal seal further includes a grooved metal ferrule bonded to said glass mass.

9. The electrolytic capacitor of claim 8, wherein said groove extends substantially around the innermost surface thereof.

References Cited

UNITED STATES PATENTS

| | | | |
|---|---|---|---|
| 3,131,337 | 4/1964 | Clement | 317—230 |
| 3,301,270 | 1/1967 | Horn | 317—230 |
| 3,302,072 | 1/1967 | O'Neil | 317—230 |
| 3,321,675 | 5/1967 | Diggens | 317—230 |

JAMES D. KALLAM, Primary Examiner

U.S. Cl. X.R.

317—234